United States Patent [19]
Lin et al.

[11] Patent Number: 5,682,216
[45] Date of Patent: Oct. 28, 1997

[54] LCD PROJECTOR CAPABLE OF PREVENTING THERMAL SHIMMERING BY USING A THERMAL DIFFUSION FILM

[75] Inventors: Falcon Lin; Shih-Yuan Yu, both of Hsinchu, Taiwan; David Booth; Arlie R. Conner, both of Tualatin, Oreg.

[73] Assignees: CTX Opto-Electronics Corp., Taipei, Taiwan; Lightware, Inc., Beaverton, Oreg.

[21] Appl. No.: 625,877

[22] Filed: Apr. 1, 1996

[51] Int. Cl.$^6$ .................. G02F 1/1333; G03B 21/16; G03B 21/18
[52] U.S. Cl. ................... 349/122; 349/161; 353/60
[58] Field of Search .................. 353/57, 60; 359/40, 359/41, 73, 83, 63; 349/122, 161, 162

[56] References Cited

U.S. PATENT DOCUMENTS

| | | | |
|---|---|---|---|
| 4,763,993 | 8/1988 | Vogeley et al. | 349/122 |
| 4,950,072 | 8/1990 | Honda | 349/161 |
| 4,963,001 | 10/1990 | Miyajima | 359/83 |
| 5,285,303 | 2/1994 | Okada et al. | 359/73 |

FOREIGN PATENT DOCUMENTS 3-164787  7/1991  Japan ..................... 353/60

*Primary Examiner*—William L. Sikes
*Assistant Examiner*—Walter J. Malinowski
*Attorney, Agent, or Firm*—Cushman Darby & Cushman IP Group of Pillsbury Madison & Sutro LLP

[57] ABSTRACT

An LCD projector includes: a light source assembly for supplying light source required for the LCD projector; an image generating mechanism for generating image to be projected, having an LCD panel; a projection objective lens assembly for projecting the image generated by the image generating mechanism onto a screen; and a cooling mechanism for cooling off the surface of the LCD panel of which the temperature is raised due to the radiation of the light source. A thermal diffusion film having good transparency and thermal diffusivity is attachd to the surface of the LCD panel on the one side nearer to the light source assembly so as to facilitate homogeneous thermal diffusion in the surface of the LCD panel, and thus prevent deterioration of quality of projected image due to thermal shimmering caused by cooling air flow coming from the cooling mechanism.

4 Claims, 4 Drawing Sheets

LCD PROJECTOR CAPABLE OF PREVENTING THERMAL SHIMMERING BY USING A THERMAL DIFFUSION FILM

TECHNICAL FIELD

This invention relates to an LCD projector capable of preventing thermal shimmering caused by cooling air flow which is made to pass through and thus to cool off the surface of the LCD panel of an LCD projector.

BACKGROUND OF THE INVENTION

The optical structure of a common single-panel LCD projector is schematically shown in FIGS. 1 and 2. As can be seen from FIG. 1, the optical structure of this LCD projector mainly comprises: a light source assembly 20 for supplying light source required for the LCD projector, an image generating mechanism 100 for generating image to be projected, and a projection objective lens assembly 30 for projecting the image generated by the image generating mechanism 100 onto a screen 50. The light source assembly 20 usually includes a light source 21, a spherical reflector 22 and an aspherical condensor 23 etc. and the projection objective lens assembly 30 is formed by several elements.

As can be seen from FIG. 2, the image generating mechanism 100 of a conventional single-panel LCD projector comprises, when arranged in the direction from the side near the light source assembly 20 to the side near the projection objective lens assembly 30 (see also FIG. 1), a rear fresnel lens 11, a hot mirror 10, a first polarization panel 8, an LCD panel 1, a second polarization panel 9 and a front fresnel lens 12.

The LCD panel 1 usually includes a first glass substrate 2 forming one side of the LCD panel 1 nearer to the light source assembly 20, a second glass substrate 3 forming another side of the LCD panel 1 and spaced from the first glass substrate 2 by a minute gap, a liquid crystal layer 4 sealed into the minute gap between the first glass substrate 2 and second glass substrate 3, a color filter 5 interposed bwteen the first glass substrate 2 and the liquid crystal layer 4 for producing color light, and an electrode layer 6 interposed between the color filter 5 and the liquid crystal layer 4 for applying voltage onto and thereby driving the liquid crystal layer 4.

In the technical developement of the single-panel LCD projector, due to the facts that the brightness of its light source is getting stronger day by day, and the size of its LCD panel is becoming smaller gradually so as to make its overall size compact and to reduce its manufacturing cost, light intensity radiated on the LCD panel and thus the surface temperature of the LCD panel has a continuously increasing tendency. Consequently, a cooling mechanism 40 such as the one shown in FIGS. 1 and 2 must be used to facilitate the cooling of the LCD panel. This cooling mechanism 40 includes a cooling fan 41 for generating a cooling air flow 45 and air guiding members 42 for guiding the generated cooling air flow 45 toward the surface of the LCD panel 1 of which the temperature has been raised due to the radiation of light ray 25 emitted from the light source assembly 20. The LCD panel 1 can then be cooled off by the cooling air flow 45 flowing through its surface.

However, it has been found (see FIG. 3), in addition to regular image, some undesirable shadow 60 also appears in the projected picture on the screen 50 due to the effect of the cooling air flow 45. The cause of appearance of the shadow 60 has been studied and considered to be as follows. Firstly, the turbulence of the cooling air flow 45 makes the local temperature on the surface of the LCD panel 1 uneven. Consequently, under the effect of the uneven temperature distribution on the surface of the LCD panel 1, its local transmittancy which depends on its local surface temperature also becomes uneven throughout its whole surface. The uneven local transmittancy, in turn, results in the appearance of undesirable shadow 60 of the cooling air flow 45 in the projected picture. This phenomenum is hereinafter referred to as "thermal shimmering". It is found that each shadow 60 extends in a direction generally parallel to an arrow A which is equivalent to another arrow B (see FIG. 2) showing the direction of the cooling air flow 45 generated by the cooling mechanism 40. This shadow 60 greatly deteriorates the quality of the projected picture.

In view of the aforesaid drawback of the conventional single-panel LCD projector, the object of this invention is to provide an LCD projector capable of preventing thermal shimmering.

In order to achieve the foregoing object, the LCD projector capable of preventing thermal shimmering according to this invention comprises:

- a light source assembly for supplying light source required for the LCD projector;
- an image generating mechanism for generating image to be projected, including an LCD panel and a polarization panel set, the LCD panel having a first glass substrate forming one side of the LCD panel nearer to the light source assembly, a second glass substrate forming another side of the LCD panel and spaced from the first glass substrate by a minute gap, and a liquid crystal layer sealed into the minute gap between the two glass substrates; the polarization panel set being able to control the polarization direction of the liquid crystal layer by use of voltage applied to the liquid crystal layer;
- a projection objective lens assembly for projecting the image generated by the image generating mechanism onto a screen; and
- a cooling mechanism for generating a cooling air flow that is made to pass through and cool off the surface of the LCD panel of which the temperature has been raised due to the radiation of the light source;

characterized by further comprising:

- a thermal diffusion film which has good transparency and thermal diffusivity and is attachd to one side of the first glass substrate nearer to the light source assembly so as to facilitate homogeneous thermal diffusion on the one side of the first glass substrate, and thus prevent deterioration of quality of projected image due to thermal shimmering caused by the cooling air flow.

In the LCD projector of this invention, the LCD panel may further comprise a color filter interposed between the first glass substrate and the liquid crystal layer for producing color light, and an electrode layer interposed between the color filter and the liquid crystal layer for applying voltage onto and thereby driving the liquid crystal layer.

In the LCD projector of this invention, the polarization panel set may comprise a first polarization panel provided on one side of the LCD panel nearer to the light source assembly, and a second polarization panel provided on another side of the LCD panel.

In the LCD projector of this invention, the thermal diffusion film is preferably a plastic film made of TAC (Tri-Acetyl Cellulose).

DETAILED DESCRIPTION OF THE PREFERRED EMBODIMENT

Figure 4:
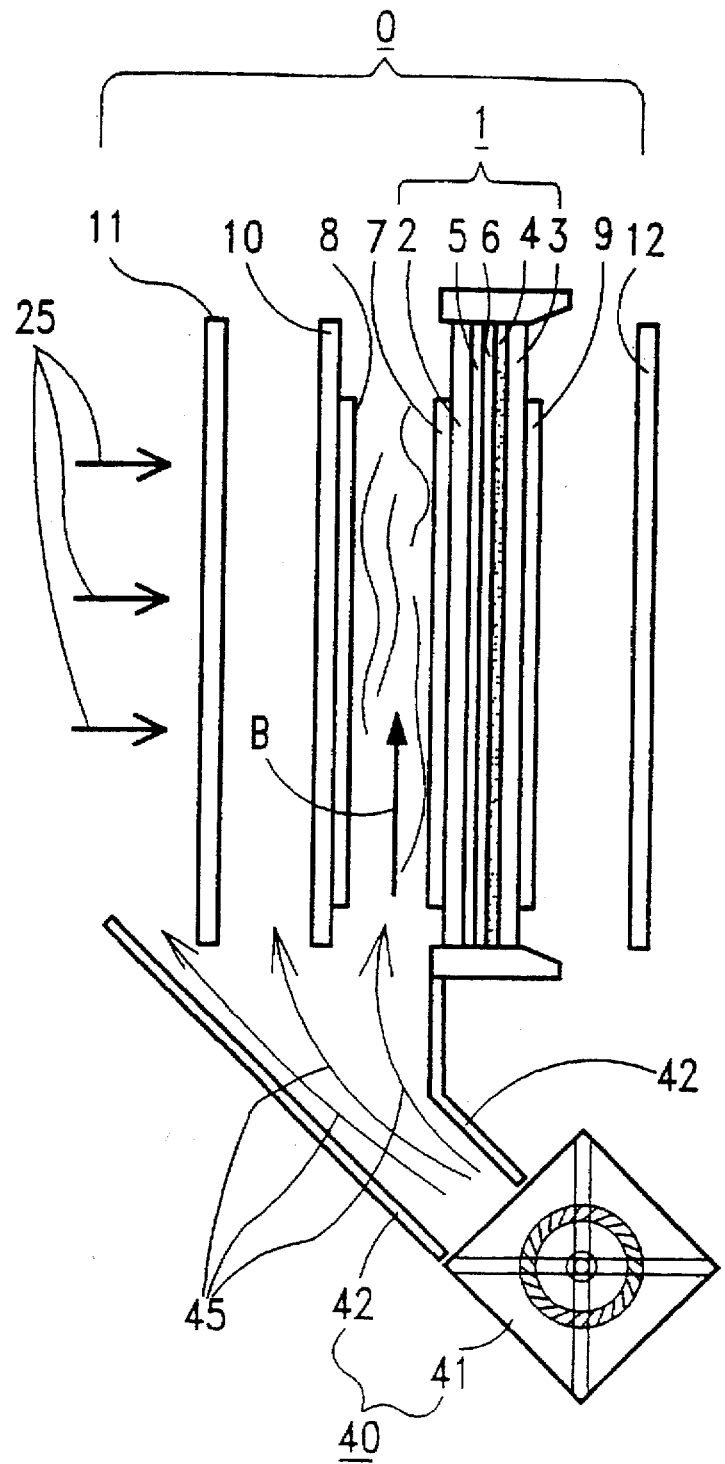
FIG. 4 is a schematic view showing the improved construction of the image generating mechanism 0 and its cooling mechanism of a single-panel LCD projector in accordance with this invention.

FIG. 4 shows the improved image generating mechanism 0 adopted in a single-panel LCD projector according to this invention.

Figure 1:
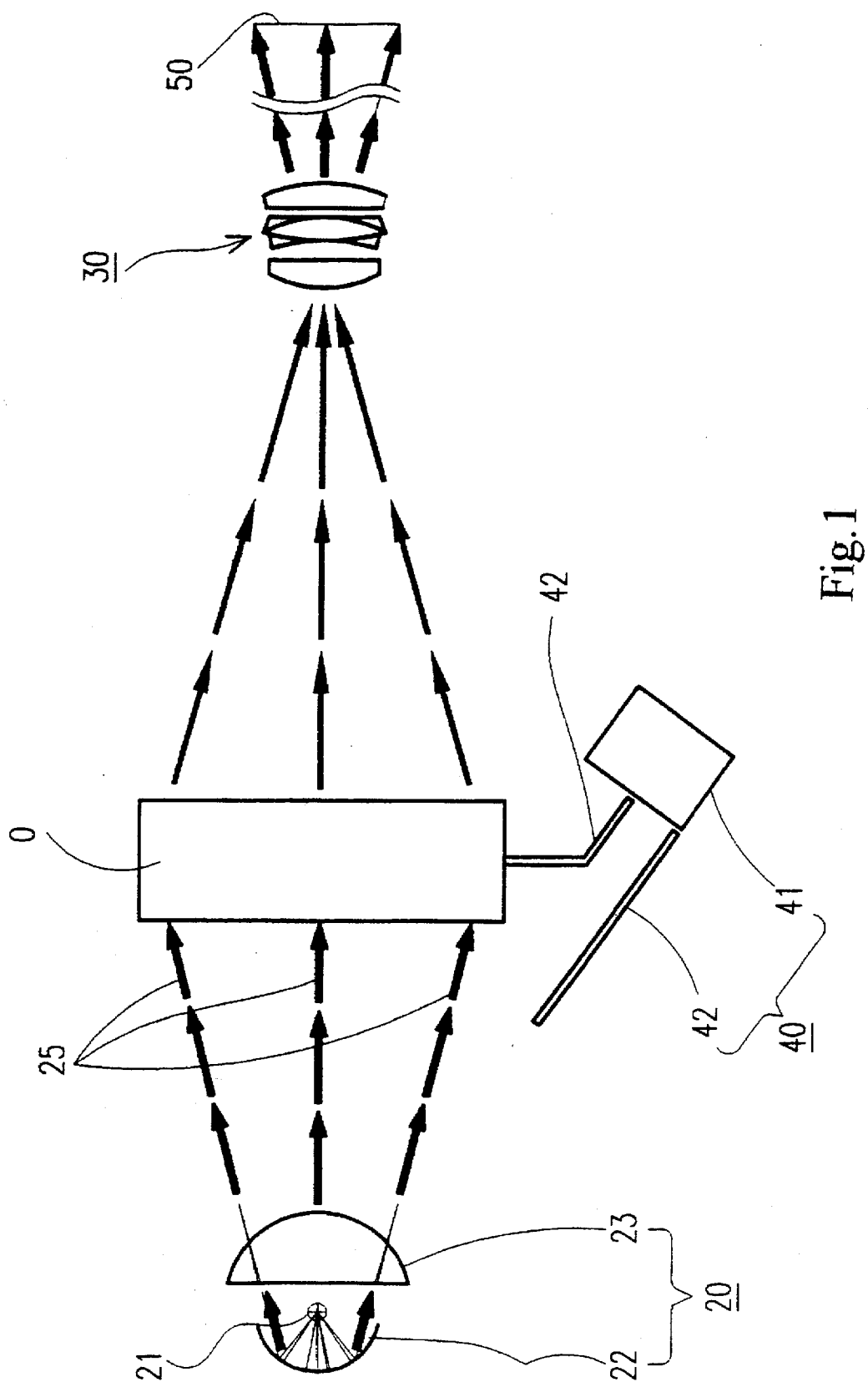
FIG. 1 is a schematic view showing the optical structure of a common single-panel LCD projector together with the construction of its cooling mechanism, wherein the image generating mechanism is shown merely by a block.
Figure 2:
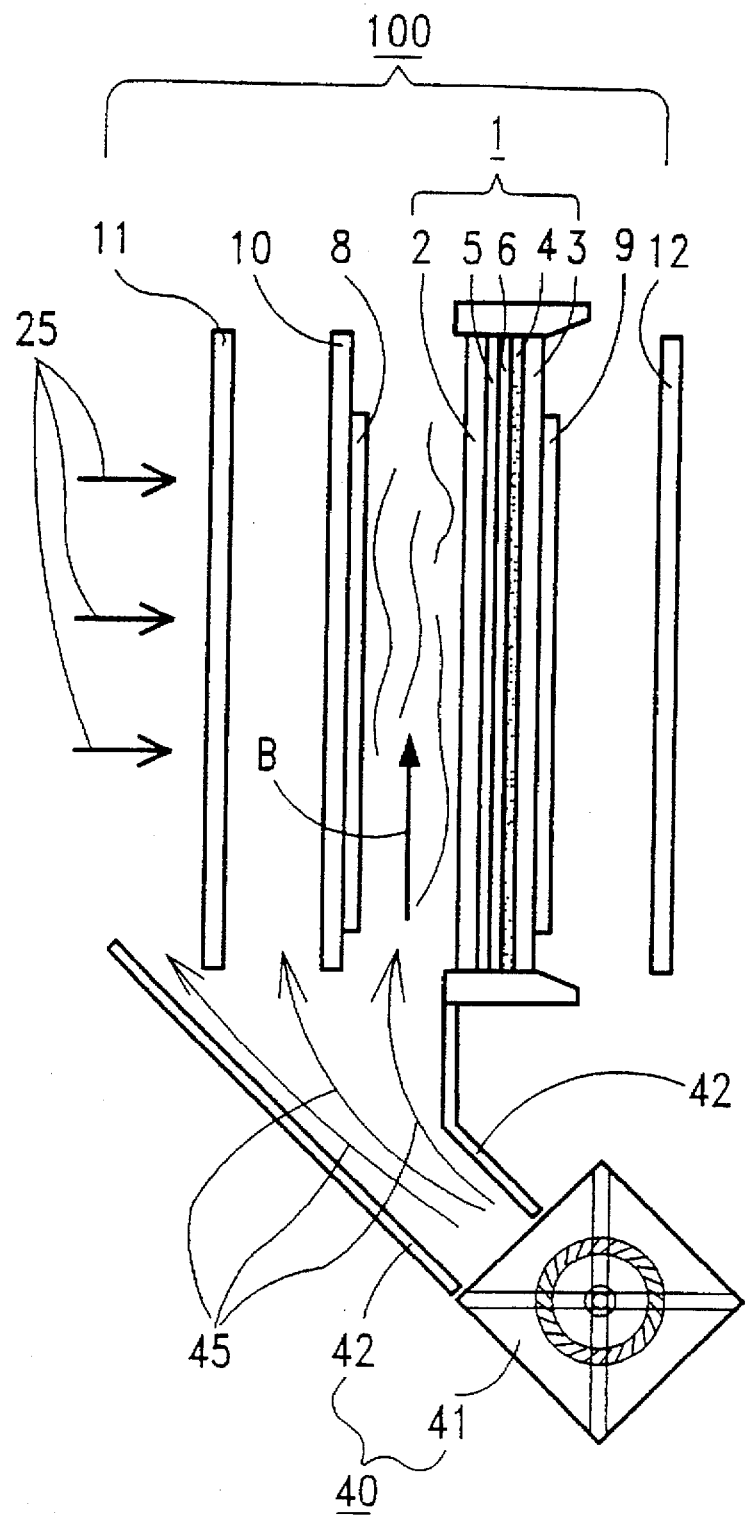
FIG. 2 is an enlarged view schematically showing the construction of the image generating mechanism and its cooling mechanism of the prior art.
Figure 3:
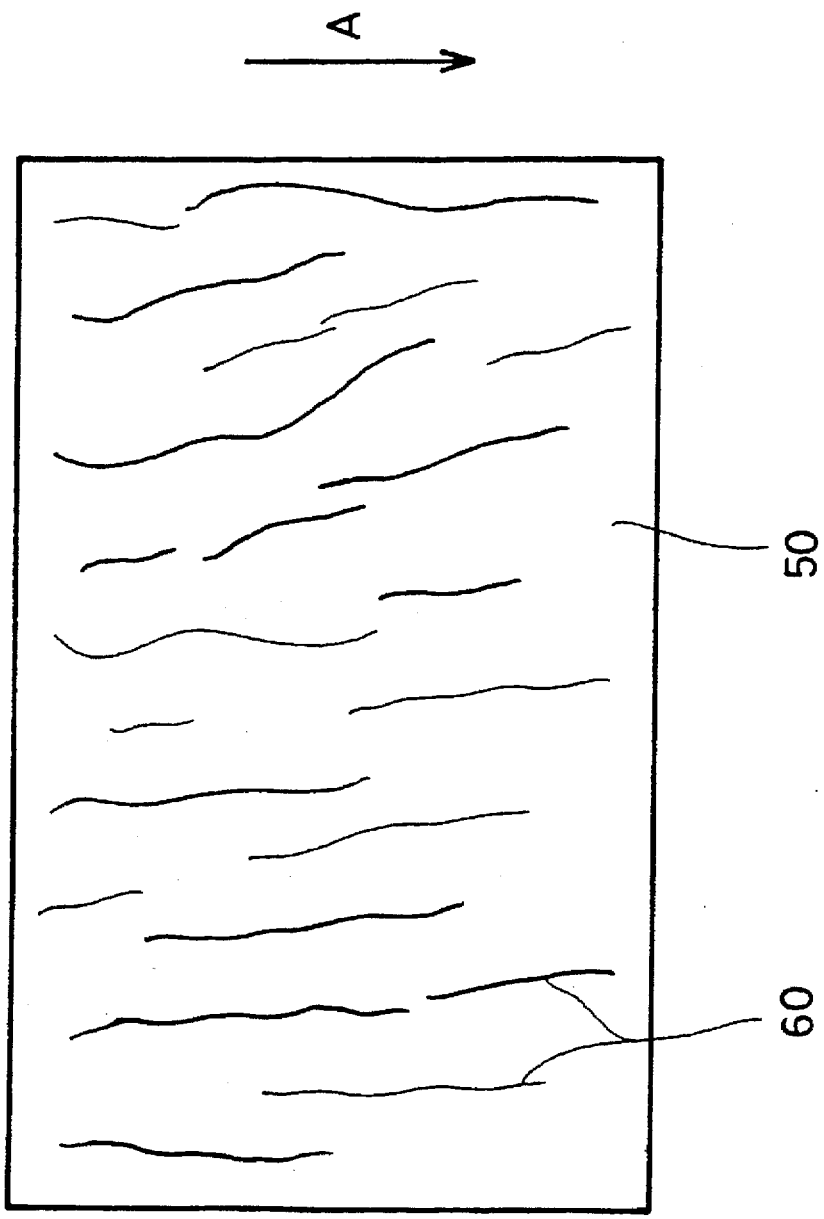
FIG. 3 is a schematic view showing the situation that the projected picture of a prior art single-panel LCD projector including an image generating mechanism 100 as shown in FIG. 2 is deteriorated due to "thermal shimmering"

The improved image generating mechanism 0 shown in FIG. 4 comprises, when arranged in the direction from the side near the light source assembly 20 to the side near the projection objective lens assembly 30 (see also FIG. 1), a rear fresnel lens 11, a hot mirror 10, a first polarization panel 8, a thermal diffusion film 7, an LCD panel 1, a second polarization panel 9 and a front fresnel lens 12.

Since the foregoing rear fresnel lens 11, hot mirror 10, first polarization panel 8, LCD panel 1, second polarization panel 9 and front fresnel lens 12 are all identical to the corresponding parts of the prior art single-panel LCD projector in their constructions and functions, the description thereof is omitted. The only difference resides in the thermal diffusion film 7 attached to the surface of the first glass substrate 2 on the one side facing the light source assembly 20, or to the incidence side of the LCD panel 1. This thermal diffusion film 7 is made of plastic material having good transparency and thermal diffusivity. Thanks to its good thermal diffasivity, the thermal diffusion film 7 can facilitate to achieve homogeneous thermal diffusion particularly in the surface of the LCD panel 1 on the incidence side, to avoid uneven temperature distribution on same surface, and thus to improve the quality of the projected picture which may othenvise be deteriorated due to "thermal shimmering". It has been found that, by adopting a thermal diffusion film 7 made of material having excellent transparency and thermal diffusivity such as TAC (Tri-Acetyl Cellulose), the unevenness in the temperature distribution on the surface of the LCD panel 1 can be greatly improved, the undesirable shadow appearing in the projected picture due to "thermal shimmering" can be completely eliminated, and thus excellent improving effect in the quality of the projected picture can be obtained.

In some poly-silicone three panel LCD projectors, it is known that TAC films with anti-reflection coating layers have been applied to their LCDs to solve the photo conductivity problem and improve the contrast. However, the use of the TAC films in this way is apparently different from that in this invention. First, the above anti-reflection coating layer is utilized in a three panel LCD projector rather than in a single panel LCD projector as in this invention. Second, in the above poly-silicone LCD projector, TAC film is applied to the output side of the LCD instead of the light incidence side thereof as in this invention. Lastly, through the use of TAC films, problems to be solved are different. One is for solving the problem of photo conductivity, while the other is for eliminating thermal shimmering.

While this invention has been described in terms of a preferred embodiment, it is to be understood that the invention need not be limited to the disclosedembodiment. Various modifications and similar changes are still possible within the spirit of this invention. For example, Polycarbonate, instead of TAC (Tri-Acetyl Cellulose) as described above, may also be used for the material of the thermal diffusion film 7. Besides, the single-panel LCD projector according to this invention may certainly be changed slightly in its comprising members and their arrangement as compared with that described above. The scope of this invention should, therefore, be defined by the appended claims.

What is claimed is:

1. An LCD projector capable of preventing thermal shimmering, comprising:

a light source assembly for supplying light required for said LCD projector;

an image generating mechanism for generating image to be projected, including an LCD panel and a polarization panel set, said LCD panel having a first glass, substrate forming one side of said LCD panel nearer to said light source assembly, a second glass substrate forming another side of said LCD panel and spaced from said first glass substrate by a minute gap, and a liquid crystal layer sealed into said minute gap between said two glass substrates; said polarization panel set being able to control the polarization direction of said liquid crystal layer by use of voltage applied to said liquid crystal layer;

a projection objective lens assembly for projecting the image generated by said image generating mechanism onto a screen; and a cooling mechanism for generating a cooling air flow that is made to pass through and cool off the surface of said LCD panel of which the temperature is raised due to the radiation of said light source;

characterized by further comprising:

a thermal diffusion film which has good transparency and thermal diffusivity and is attached to one side of said first glass substrate nearer to said light source assembly so as to facilitate homogeneous thermal diffusion on said one side of said first glass substrate, and thus prevent deterioration of quality of projected image due to thermal shimmering caused by said cooling air flow.

2. The LCD projector capable of preventing thermal shimmering as defined in claim 1, wherein said LCD panel further comprises a color filter interposed between said first glass substrate and said liquid crystal layer for producing color light, and an electrode layer interposed between said color filter and said liquid crystal layer for applying voltage onto and thereby driving said liquid crystal layer.

3. The LCD projector capable of preventing thermal shimmering as defined in claim 1, wherein said polarization panel set comprises a first polarization panel provided on one side of said LCD panel nearer to said light source assembly, and a second polarization panel provided on another side of said LCD panel.

4. The LCD projector capable of preventing thermal shimmering as defined in claim 1, 2 or 3 wherein said thermal diffusion film is a plastic film made of TAC (Tri-Acetyl Cellulose).

* * * * *